(12) United States Patent
Roy et al.

(10) Patent No.: US 11,262,469 B2
(45) Date of Patent: Mar. 1, 2022

(54) SYSTEM AND METHOD FOR SEISMIC AMPLITUDE ANALYSIS

(71) Applicant: Chevron U.S.A. Inc., San Ramon, CA (US)

(72) Inventors: Prasenjit Roy, Katy, TX (US);
Anandaroop Ray, Houston, TX (US);
Reynaldo Cardona, Katy, TX (US);
David C. Bartel, Houston, TX (US);
Jacob G. Tesfaye, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 314 days.

(21) Appl. No.: 16/529,870

(22) Filed: Aug. 2, 2019

(65) Prior Publication Data
US 2020/0041677 A1 Feb. 6, 2020

Related U.S. Application Data

(60) Provisional application No. 62/713,612, filed on Aug. 2, 2018.

(51) Int. Cl.
*G01V 1/30* (2006.01)
*G01V 1/34* (2006.01)

(52) U.S. Cl.
CPC ............... *G01V 1/307* (2013.01); *G01V 1/306* (2013.01); *G01V 1/345* (2013.01); *G01V 2210/6244* (2013.01); *G01V 2210/632* (2013.01)

(58) Field of Classification Search
CPC ......... G01V 1/307; G01V 1/306; G01V 1/345
See application file for complete search history.

(56) References Cited

U.S. PATENT DOCUMENTS

| 7,697,373 | B1 | 4/2010 | Padgett |
| 10,725,189 | B2 * | 7/2020 | Osypov ................. G01V 1/301 |
| 2004/0240321 | A1 | 12/2004 | Canning |
| 2016/0327672 | A1 | 11/2016 | Lacombe et al. |
| 2019/0041534 | A1 * | 2/2019 | Bandura ................ G01V 1/302 |

OTHER PUBLICATIONS

PCT International Search Report and Written Opinion, dated Dec. 17, 2019, issued in International Application No. PCT/IB2019/056591, filed on Aug. 2, 2019, 12 pages.

* cited by examiner

*Primary Examiner* — Bryan Bui
(74) *Attorney, Agent, or Firm* — Marie L. Clapp

(57) ABSTRACT

A method is described for seismic amplitude analysis including receiving a seismic dataset representative of a subsurface volume of interest wherein the seismic dataset includes an angle or angle stack dimension; select a plurality of sets of sub-cubes in the seismic dataset wherein each set of sub-cubes includes a plurality of the angles or the angle stacks; compute standard score statistics for each of the plurality of sub-cubes; identify amplitude variation with angle (AVA) anomalies based on the standard score statistics for each of the set of sub-cubes; classify the AVA anomalies to generate classified AVA anomalies; and displaying, on a user interface, the classified AVA anomalies as a graphical display. The method is executed by a computer system.

6 Claims, 14 Drawing Sheets

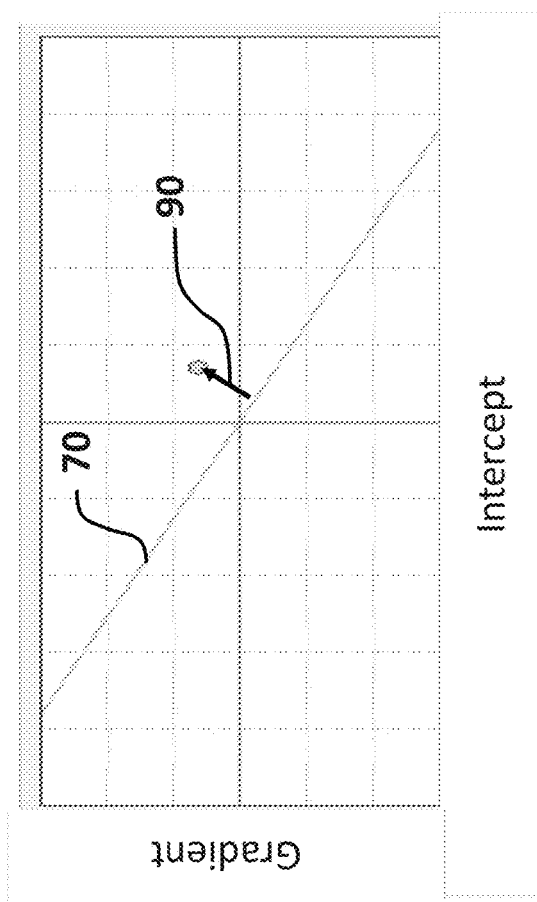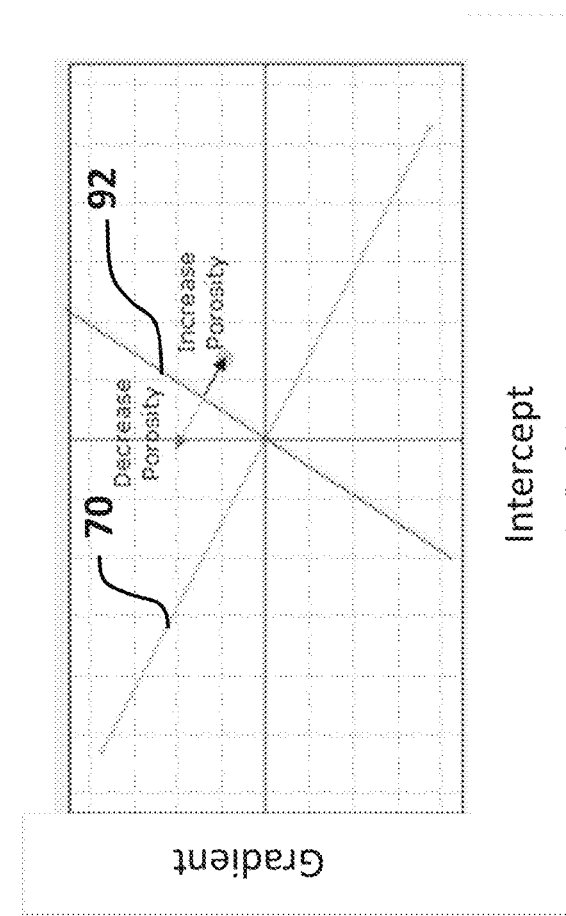

SYSTEM AND METHOD FOR SEISMIC AMPLITUDE ANALYSIS

CROSS-REFERENCE TO RELATED APPLICATIONS

The present application claims priority from U.S. Provisional Patent Application No. 62/713,612 filed Aug. 2, 2018.

STATEMENT REGARDING FEDERALLY SPONSORED RESEARCH OR DEVELOPMENT

Not applicable.

TECHNICAL FIELD

The disclosed embodiments relate generally to techniques for seismic amplitude analysis and, in particular, to a method of automatically identifying amplitude anomalies in a seismic volume to identify hydrocarbon reservoirs and/or physical rock properties.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

In hydrocarbon exploration, we commonly rely on visualization and qualitative methods for identifying amplitude variation with angle (AVA) anomalies in seismic data for identifying hydrocarbons via direct hydrocarbon indicators (DHI) or inferring rock properties. We classify the anomalies into different AVA classes and attempt to make inference on DHI and or rock properties by matching synthetic models with analog well data. The AVA classification scheme primarily relies on intercept and gradient attributes. These attributes are easy to compute trace by trace for every samples but often are very noisy and unreliable for inferences due to the following reasons:

Gather flatness: Events across different angle stacks may not be sufficiently flat in time and capture unrelated amplitudes for AVA classification.

Frequency: Different frequency content across different angle stacks may lead to sample anomalous amplitudes.

Calibration: In addition to calibrate across different angle stacks for a given time, it also requires samples to be calibrated across time.

Side lobes: All conventional algorithms that rely on single or limited samples would result in very noisy gradient estimation in relatively low amplitude side lobes.

Due to these issues, intercept and gradient attributes calculated from 3D seismic data are often unusable for interpretation. To minimize the negative impacts from the above issues, interpretation using AVA attributes are often calculated on horizon slices that ensure tracking of same seismic event across the seismic volume. However, horizon slices are not an optimal solution because they are time consuming to generate, they are prone to picking errors, and they only provide information at one time sample rather than the whole wavelet.

The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved seismic amplitude analysis that will allow better seismic interpretation of potential hydrocarbon reservoirs.

SUMMARY

In accordance with some embodiments, a method of seismic amplitude analysis including receiving a seismic dataset representative of a subsurface volume of interest wherein the seismic dataset includes an angle or angle stack dimension; selecting a plurality of sets of sub-cubes in the seismic dataset wherein each set of sub-cubes includes a plurality of the angles or the angle stacks; computing standard score statistics for each of the plurality of sub-cubes; identifying amplitude variation with angle (AVA) anomalies based on the standard score statistics for each of the set of sub-cubes; classifying the AVA anomalies to generate classified AVA anomalies; and displaying, on a user interface, the classified AVA anomalies as a graphical display is disclosed. The standard score statistics may include z-score statistics, t-test statistics, or any other statistics that compare distributions of two populations. The classified AVA anomalies are used for hydrocarbon reservoir identification and hydrocarbon extraction.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIG. 9A illustrates a normal (fluid) vector relationship to the background shale trend;

FIG. 9B illustrates a parallel (porosity) relationship to the background shale trend;

Like reference numerals refer to corresponding parts throughout the drawings.

DETAILED DESCRIPTION OF EMBODIMENTS

Figure 1:
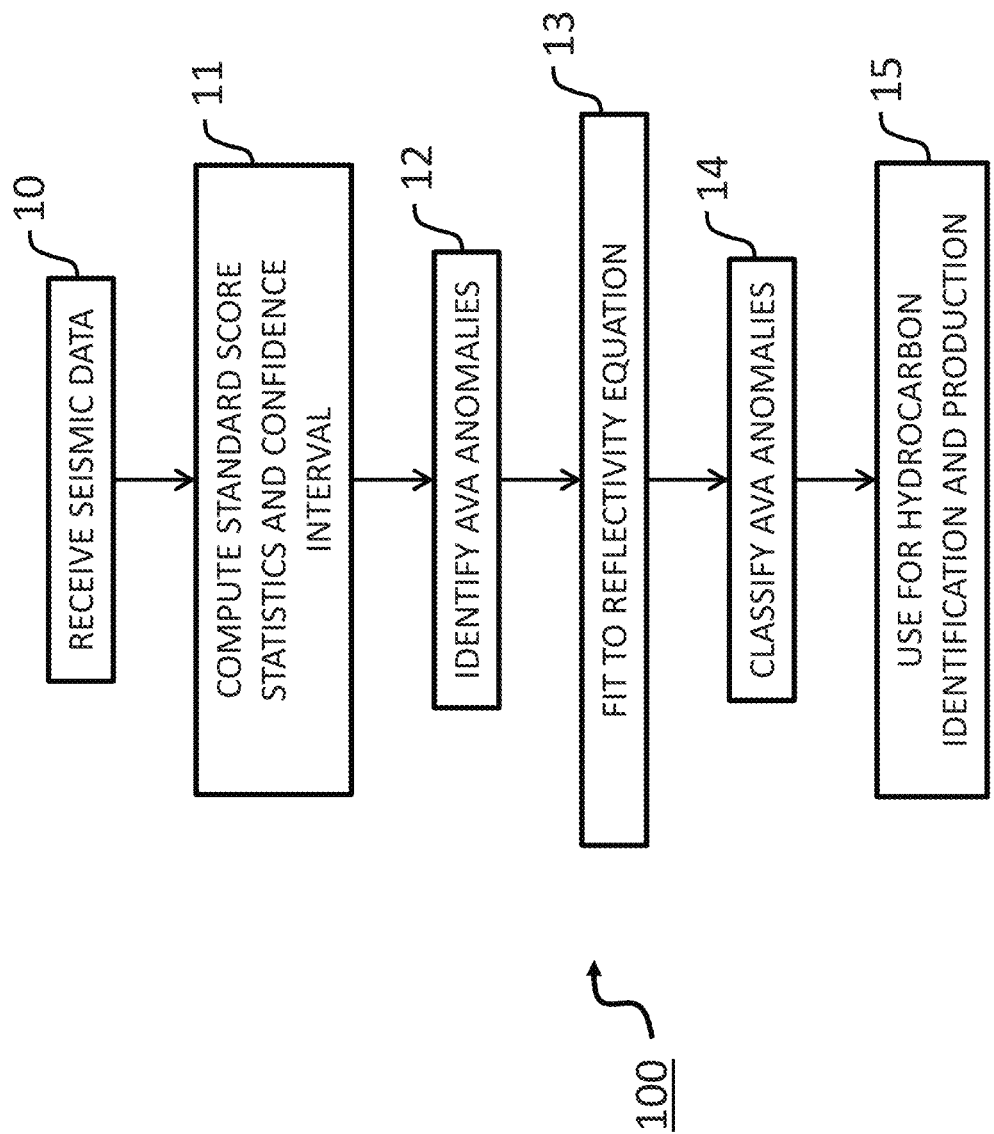
FIG. 1 illustrates a method of seismic amplitude analysis, in accordance with some embodiments.

Described below are methods, systems, and computer readable storage media that provide a manner of seismic amplitude analysis. These embodiments are designed to be of particular use for identifying location of hydrocarbons in the earth's subsurface.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. Analysis of the seismic amplitudes allows identification of amplitude anomalies that may indicate the presence of hydrocarbons (i.e., a Direct Hydrocarbon Indicator DHI) or changes in rock properties including fluid content.

Advantageously, those of ordinary skill in the art will appreciate, for example, that the embodiments provided herein may be utilized to generate a digital seismic image including additional seismic attributes. The digital seismic image may improve hydrocarbon exploration and improve hydrocarbon production. The digital seismic image may provide details of the subsurface that were illustrated poorly or not at all in traditional seismic images. Moreover, the digital seismic image may better delineate where different features begin, end, or any combination thereof. As one example, the digital seismic image may illustrate faults more accurately. As another example, assume that the digital seismic image indicates the presence of a hydrocarbon deposit. The digital seismic image may delineate more accurately the bounds of the hydrocarbon deposit so that the hydrocarbon deposit may be produced.

Those of ordinary skill in the art will appreciate, for example, that the digital seismic image may be utilized in hydrocarbon exploration and hydrocarbon production for decision making. For example, the digital seismic image may be utilized to pick a location for a wellbore. Those of ordinary skill in the art will appreciate that decisions about (a) where to drill one or more wellbores to produce the hydrocarbon deposit, (b) how many wellbores to drill to produce the hydrocarbon deposit, etc. may be made based on the digital seismic image. The digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Those of ordinary skill in the art will appreciate, for example, that the digital seismic image may be utilized in hydrocarbon exploration and hydrocarbon production for control. For example, the digital seismic image may be utilized to steer a tool (e.g., drilling tool) to drill a wellbore. A drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the digital seismic image may be utilized for controlling flow of fluids injected into or received from the subsurface, the wellbore, or any combination thereof. As another example, the digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the digital seismic image may prompt activation, deactivation, modification, or any combination thereof of the chokes or well control devices so as control the flow of fluid. Thus, the digital seismic image may be utilized to control injection rates, production rates, or any combination thereof.

Those of ordinary skill in the art will appreciate, for example, that the digital seismic image may be utilized to select completions, components, fluids, etc. for a wellbore. A variety of casing, tubing, packers, heaters, sand screens, gravel packs, items for fines migration, etc. may be selected for each wellbore to be drilled based on the digital seismic image. Furthermore, one or more recovery techniques to produce the hydrocarbon deposit may be selected based on the digital seismic image.

In short, those of ordinary skill in the art will appreciate that there are many decisions (e.g., in the context of (a) steering decisions, (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

The present invention includes embodiments of a method and system for seismic amplitude analysis. In this paper, the terms amplitude variation with offset (AVO) and amplitude variation with angle (AVA) will be used interchangeably. The method relies on first classifying the seismic dataset into background, i.e., no statistical change in amplitude distribution with angles (no AVA) and AVA anomaly volumes using standard score statistics prior to calculating seismic attributes (e.g., intercept and gradient, etc.). This classification allows detection of background AVA which is characteristic of conventional shale rock and assign zero intercept and gradient values. This significantly reduces noise in the computed intercept and gradient values as small amplitudes that are associated with these shale rock lead to spurious gradient values.

FIG. 1 illustrates a method 100 for seismic amplitude analysis. At operation 10, a seismic dataset is received. This seismic dataset is at least three dimensional, with a time or depth axis, a spatial axis (i.e. x and/or y representative of shot and/or receiver spatial locations), and an angle or offset axis. The angle or offset axis may include individual samples (e.g., 5°, 6°, 7°, etc.) or multiple stacked angle/offset ranges (e.g., near (for example, summation along angles ~3°-15°), mid (for example, summation along angles ~12°-25°), and far (for example, summation along angles ~24°-60°)). Instead of using a single sample from each angle or stack for intercept, gradient, and other seismic attribute calculations, the method uses mean amplitude by calculating a mean of many samples from small sub-cube windowed around the sample of interest, as demonstrated in FIG. 2. The sub-cube dimension should be large enough to have enough samples for statistical measurement but not larger than the size of the anomaly that we intend to identify. By way of example and not limitation, an optimum sub-cube may be of the following dimension: Ten in-lines, ten cross-lines, and four time samples on either side of sample of interest; total samples= (21*21*4=3969). This sub-cube would be formed for each angle or angle stack in the seismic data.

Figure 2:
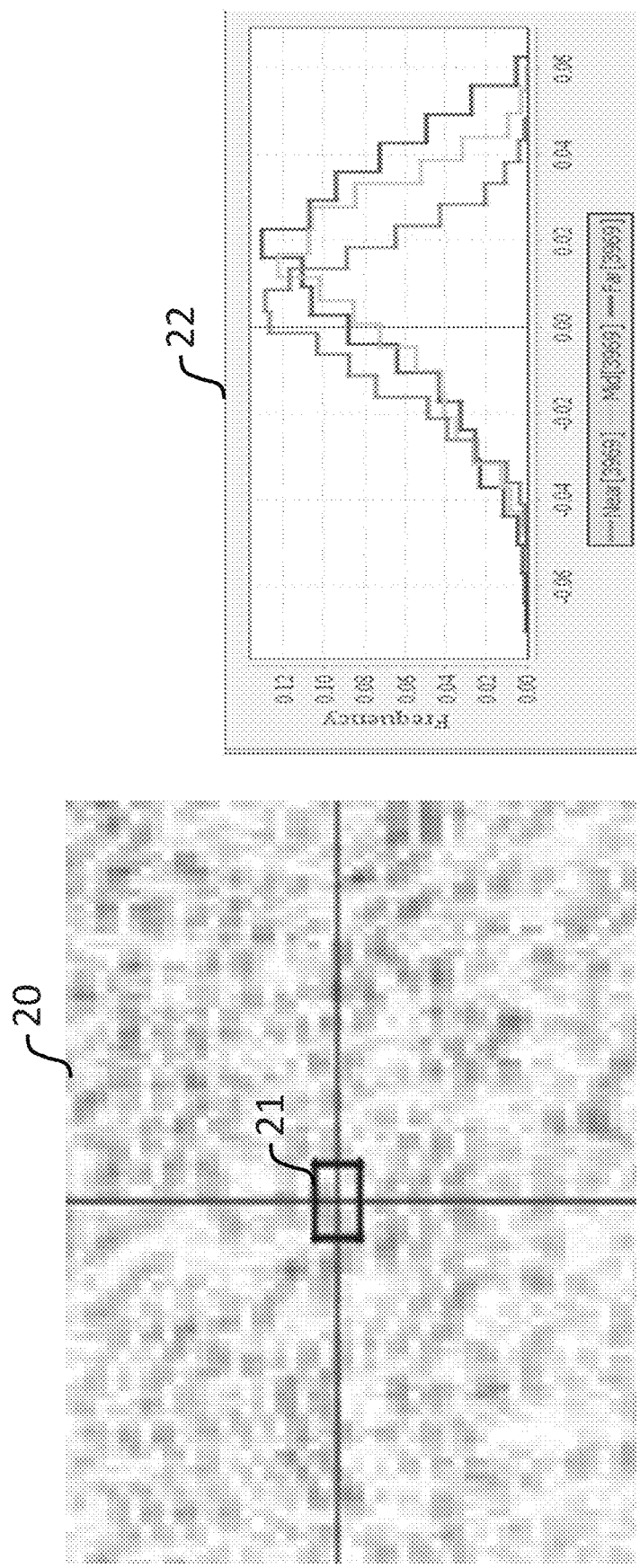
FIG. 2 is an example of a step of the method of seismic amplitude analysis, in accordance with some embodiments.
Figure 3:
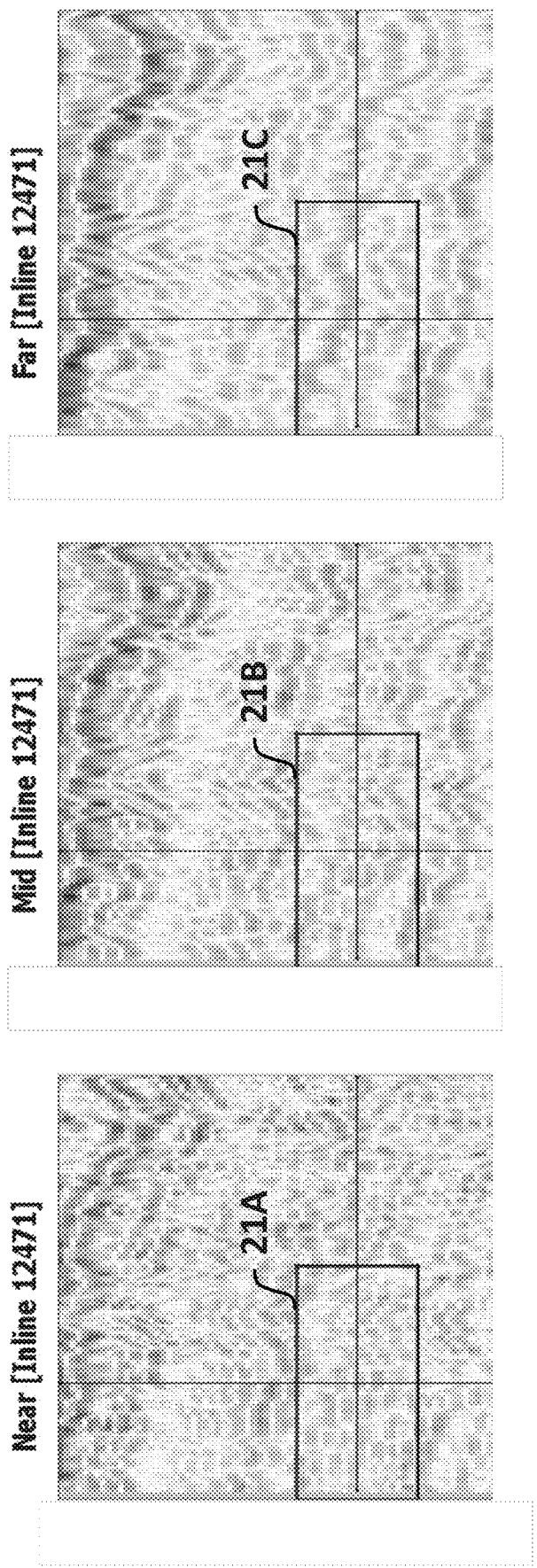
FIG. 3 is an example of a step of the method of seismic amplitude analysis, in accordance with some embodiments.

FIG. 2 shows a seismic section 20 with the sub-cube 21 around the sample of interest. This is just a 2-D representation for the 3-D volume. Additionally, although this figure shows only one sub-cube for one sample of interest, in practice there will be hundreds or thousands of samples of interest with their respective sub-cubes. FIG. 2 also shows a histogram of the amplitudes present in the sub-cube with the frequency axis indicating the relative number of samples for each amplitude range (x-axis). The display shows the amplitude histogram and distribution of amplitudes for the near angle stack, mid angle stack, and far angle stack for the single sub-cube shown. Again, in practice this is done for a large number of sub-cubes. The mean amplitude in each sub-cube is calculated for each angle or angle stack as demonstrated in FIG. 3. FIG. 3 shows a near stack sub-cube 21A, a mid stack sub-cube 21B, and a far stack sub-cube 21C. The three sub-cubes in FIG. 3 make up a set of sub-cubes for the sample of interest.

Referring again to FIG. 1, operation 11 computes standard score statistics and confidence interval for each sub-cube. By way of example and not limitation, the standard score statistics may be a z-score or a t-test. The z-score is a measure of how many standard deviations apart a sample value is compared to its population mean, where samples are normally distributed.

$$z_i = \frac{x_i - \mu}{\sigma}$$

$x_i$: sample value; $\mu$: population mean; $\sigma$: population standard deviation When samples are distributed normally then the z-scores will be distributed normally and can provide a measure of deviation from the mean. Properties of z-score include:
1. The mean of z-score is always zero with standard deviation equal to 1, standard normal distribution.
2. The graph of the z-score distribution always has the same shape as the original distribution of sample values
3. When samples are normally distributed, we can find out the probability of a score occurring directly from z-scores.
4. Any two samples from different distribution with different standard deviation can be compared using standard z-score statistics.

In general, the following inferences may be made:
Two samples are similar if z<2. This means the two distributions have less than ~5% probability of being different.
Two samples are different if z>=2.
If the samples are not distributed normally, according to the Central Limit Theorem, their sample means will be normally distributed and therefore the z-scores will be normally distributed as well.

$$z = \frac{\overline{X} - \mu}{SE_{\overline{X}}}$$

$\overline{X}$: Mean of sample means; $\mu$: population mean; $SE_{\overline{X}}$: Standard error of sample means The above equation may be extended to compare two independent unbiased distributions:

$$z = \frac{\overline{X}_1 - \overline{X}_2}{SE_{\overline{X}_{1,2}}}$$

$$SE_{\overline{X}_{1,2}} = \sqrt{\frac{\sigma_1^2}{n_1} + \frac{\sigma_2^2}{n_2}}$$

$\overline{X}_1$: Mean of amplitude distribution 1; $\overline{X}_2$: Mean of amplitude distribution 2;
$SE_{\overline{X}_{1,2}}$: Standard Error of the two amplitude distributions
$\sigma_1^2$: Variance of amplitude distribution 1; $\sigma_2^2$: Variance of amplitude distribution 2 Note: Variance is additive P-value (probability value) associated with z-score is computed from cumulative distribution function (CDF) curve of the standard normal distribution of z-scores. This generates the confidence interval or probability of acceptance for the z-score. Higher confidence corresponds to bigger z-scores or better separation between the sample means.

Referring again to FIG. 1, operation 12 identifies AVA anomalies by differentiating between the background shale AVA trend and other AVA behavior. For any two or more angles or angle stacks (e.g., Near and Far), compute z-scores for all sub-cubes marching trace by trace for all samples in the volume of interest. Standard z-scores may be used to statistically identify AVA anomalies and classify them into standardized AVA classes using the following hierarchical sequence:

Background (Class=0): The first step is to classify background that is identified using the following criteria:

1. Statistically similar distribution of amplitudes for all angle stacks.

2. Mean amplitude for all angle stacks sufficiently close to zero.

$$\text{Class} = \begin{cases} 0: & \text{if } |z| < 2 \text{ AND zero amplitude lies between } P30 \\ & \text{and } P70 \text{ of sample amplitudes } pdf \\ 99: & \text{else} \end{cases}$$

Figure 4:
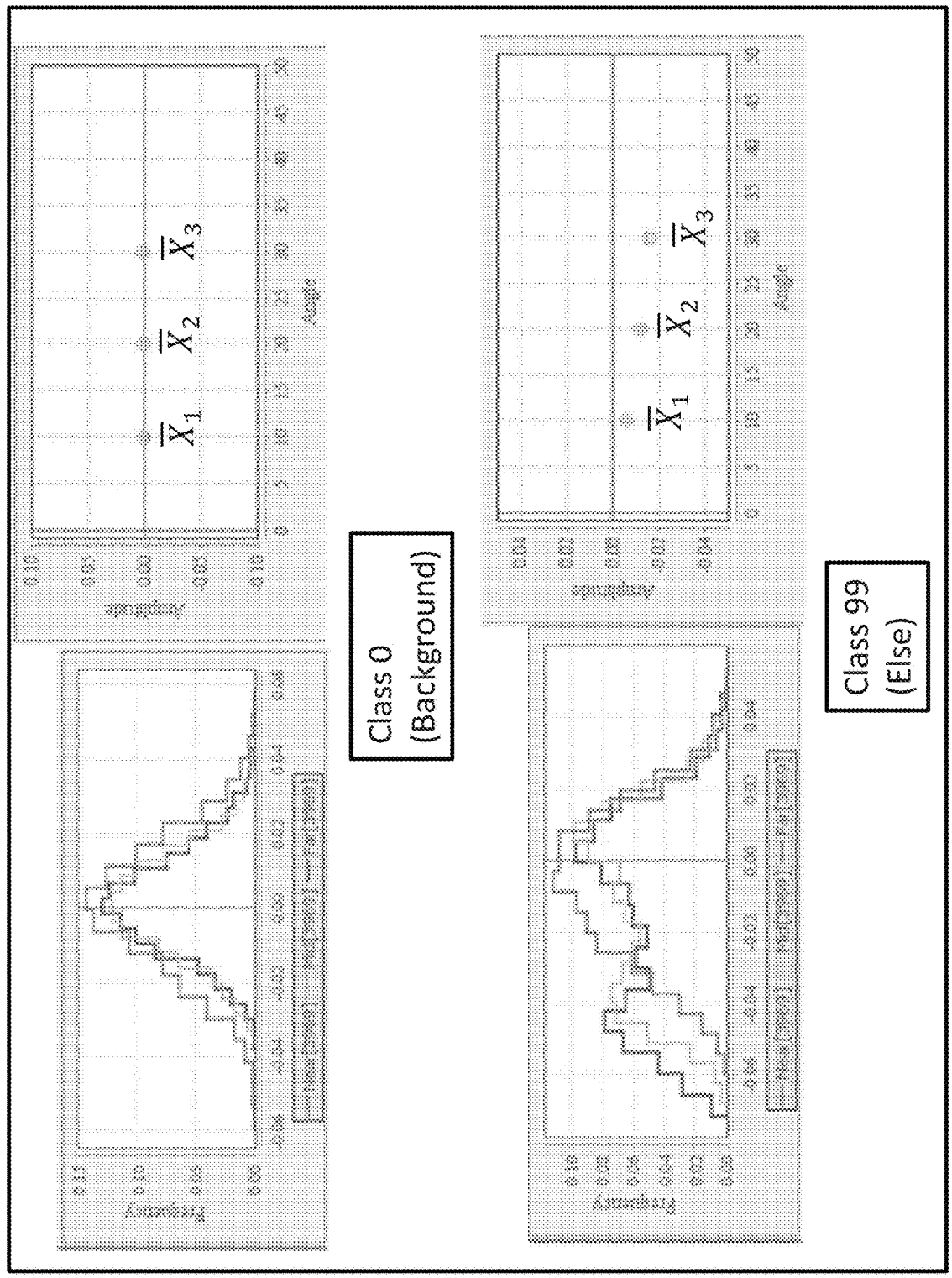
FIG. 4 is an example of a step of the method of seismic amplitude analysis, in accordance with some embodiments.

Samples that are not classified as background (Class=0) are classified as anomaly (Class 99). This is demonstrated in FIG. 4. In the top section of FIG. 4, the z-scores indicate that the sub-cube represents background AVA behavior. The bottom section of FIG. 4 indicates that the sub-cube has some AVA behavior other than what is considered background.

Figure 5:
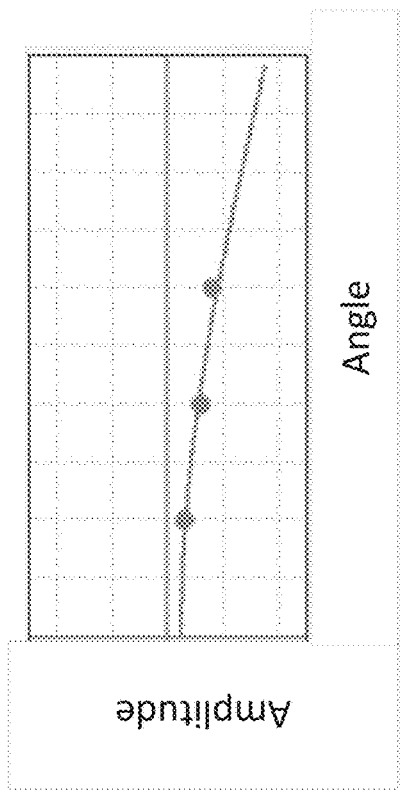
FIG. 5 is an example of a step of the method of seismic amplitude analysis, in accordance with some embodiments.

Again referring to FIG. 1, operation 13 estimates the AVA intercept and gradient values for all samples that are classified as non-background (class=99), using methods that are well known in the art. The Intercept (A) and Gradient (B) are computed using least squared regression by fitting to a reflectivity equation such as Shuey's approximation as shown, by way of example and not limitation, in FIG. 5:

$$R(\theta) = A + B \sin^2 \theta + C \sin^2 \theta \tan^2 \theta$$

This is accomplished by performing least squares fit to solve for the three coefficients (A, B, and C) using computed means from 'n' angles or angle stacks:

$$\overline{X}_1(\theta_1) = A + B\sin^2\theta_1 + C\sin^2\theta_1\tan^2\theta_1$$
$$\overline{X}_2(\theta_2) = A + B\sin^2\theta_2 + C\sin^2\theta_2\tan^2\theta_2$$
$$\ldots$$
$$\overline{X}_n(\theta_n) = A + B\sin^2\theta_n + C\sin^2\theta_n\tan^2\theta_n$$

For curve fitting, the method may use the mean of mean distribution for each angle or angle stack. This provides robust statistics for all angles or angle stacks and provide a reliable estimate of A and B coefficients.

Figure 6:
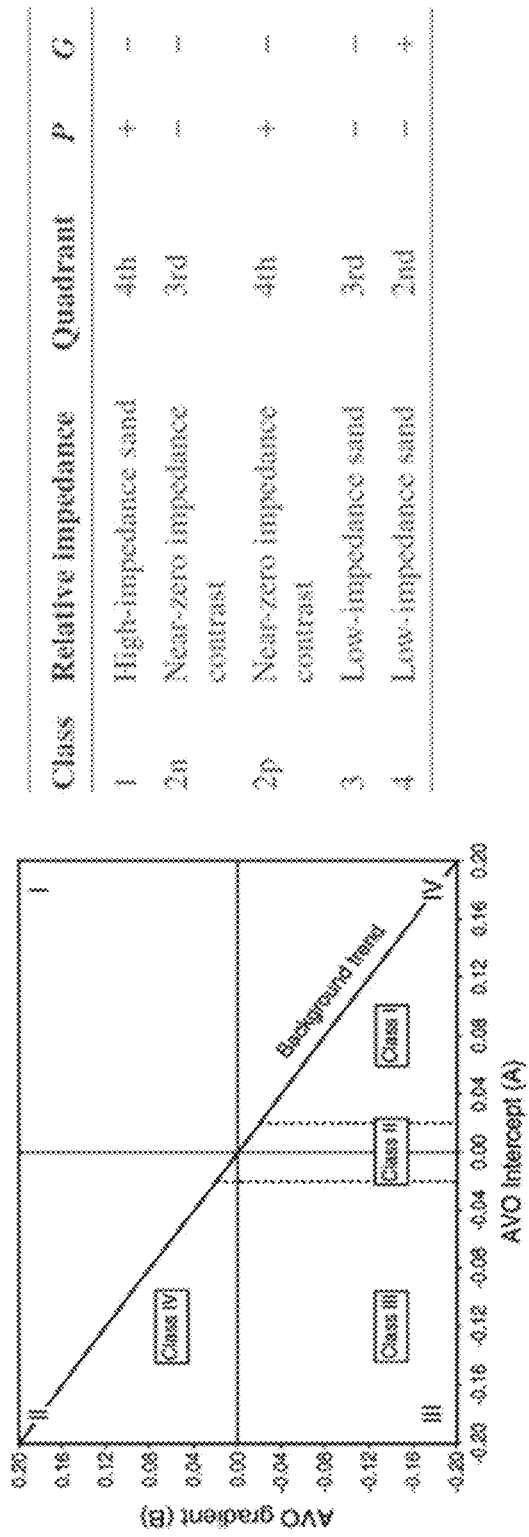
FIG. 6 illustrates classes of AVO/AVA anomalies.

With all the intercepts and gradients computed, method 100 of FIG. 1 moves to operation 14 to classify the AVA anomalies using the AVA classes known to those of skill in the art. The computed coefficients (A and B) and their sign are utilized for classifying the anomalies into AVA classes based on zero phase seismic data (illustrated and defined in FIG. 6).

$$\text{Class} = \begin{cases} 1: & A \gg 0 \text{ AND } AVA \text{ Curve crossing } Y = 0 \\ & \text{at greater than } 20° \\ 2n: & A < 0 \text{ AND } B < 0 \\ 2p: & A > 0 \text{ AND } B < 0 \\ 3: & A \ll 0 \text{ AND } B < 0 \\ 4: & A \ll 0 \text{ AND } B > 0 \\ 5: & A > 0 \text{ AND } B > 0 \\ 6: & A \gg 0 \text{ AND } B > 0 \end{cases}$$

The additional classes (5 and 6) are special classes that show positive intercept and positive gradient for zero phase seismic data.

In some embodiments, method 100 may compute a background trend. The background trend is defined as a trend line computed in the intercept-gradient space from shale and wet sands top and base interfaces. This may be a data driven method for computing background trend lines from the seismic data, performed, for example, as follows:

1. Design a bigger sub-cube (e.g., 100×100×50=500000), both spatially and in time or depth to sample amplitudes from both top and base of potential sand-shale interfaces.

Figure 7:
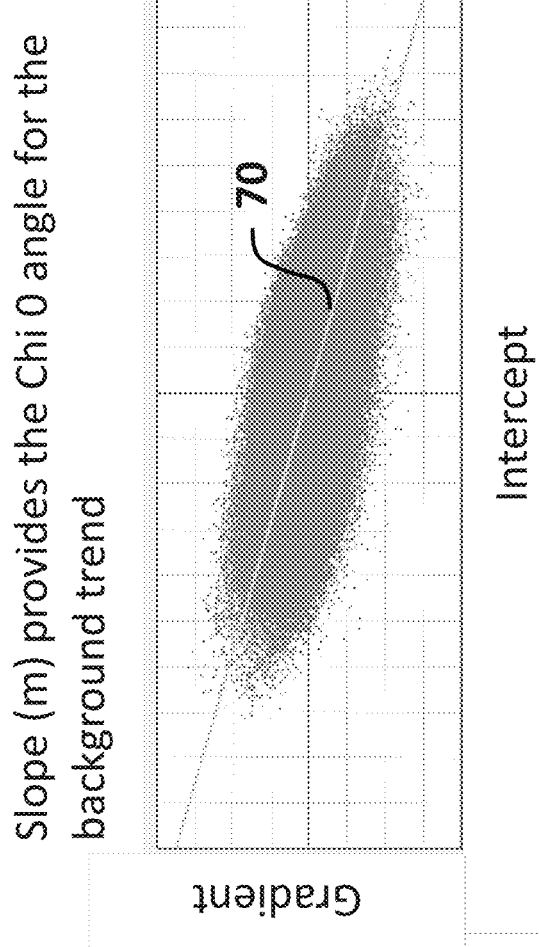
FIG. 7 illustrates an example of a background shale trend in intercept-gradient space.

2. For each sample within the sub-cube compute intercept (A) and gradient (B) using least squares fit to Shuey's approximation (as in 0044) as shown in FIG. 7.

3. Compute Reduced Major Axis (RMA) regression which minimizes errors in both X (intercept) and Y (gradient) direction:

$$Y = mx + c$$

since c=0, this then becomes $$Y = mx$$

Figure 8:
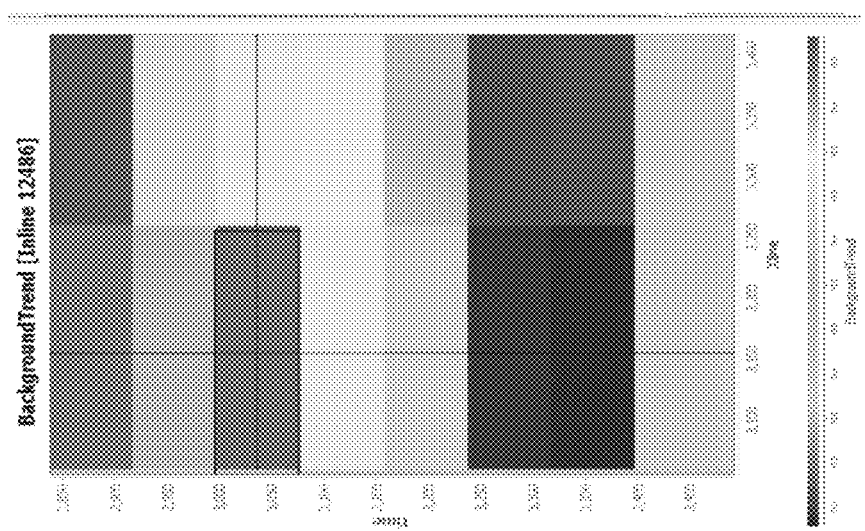
FIG. 8 illustrates an example of a spatially and temporally varying background shale trend.

FIG. 7 shows an example of an intercept vs. gradient plot with the background trend line 70 passing through the origin (0,0). By repeating the process of computing the intercepts and gradients and finding the background trend line for each sub-cube (bigger cubes), a plot of spatially and temporally varying background trend can be calculated and displayed as shown in FIG. 8.

With the AVA anomalies classified by operation 14 of method 100, the method 100 now moves on to operation 15 using the classified AVA anomalies to identify hydrocarbons in the subsurface volume of interest and produce them (e.g., extract them). Some AVA classes are, themselves, direct hydrocarbon indicators (DHIs). Method 100 provides a way to screen large volumes of 3D seismic data and automatically detect DHIs, which is particularly useful for exploration or lease sales. This automated method will be substantially faster than conventional methods.

Figure 10:
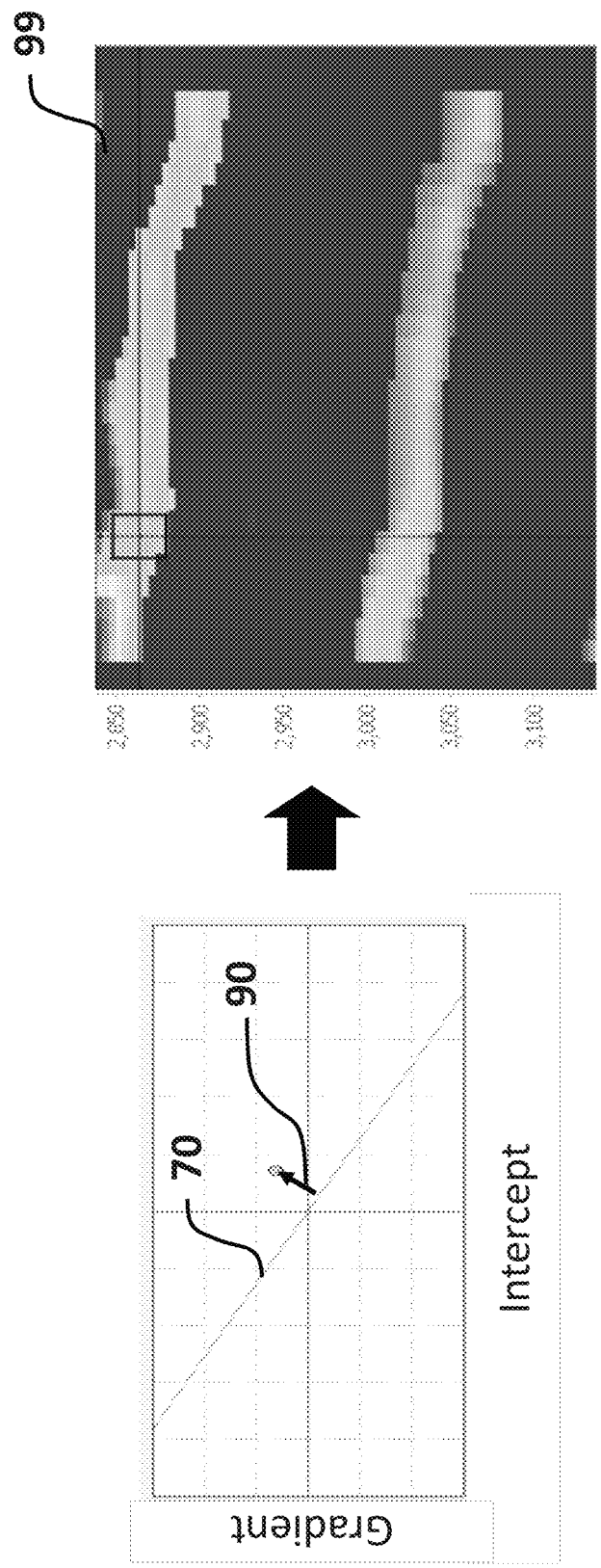
FIG. 10 illustrates a step of estimating fluid vectors for the volume of interest.

Operation 15 may also include calculations of additional attributes such as the normal (fluid) vector and the parallel (porosity) vector. These are demonstrated, for a single sample, in FIGS. 9A and 9B respectively. Since method 100 reduces noise in attribute calculations based on intercept and gradient volumes, it is possible to more reliably determine both normal and parallel vectors. The normal vector 90 for a single sample's sub-cube is found by calculating the perpendicular distance of intercept and gradient as a normal to the background trend (FIG. 9A). The parallel vector is calculated as the distance of intercept and gradient computed for each sample from the normal to the background trend line 92 passing through the origin as shown in FIG. 9B. The normal to the background trend line 92 provides a mean porosity trend. Perpendicular distance from the normal is proportional to porosity changes from mean porosity. As previously stated, FIGS. 9A and 9B demonstrate the normal vector and parallel vector for a single sample's sub-cube; in order for the method to be used for operation 15, identifying and producing hydrocarbons, these calculations must be made for a huge number of samples throughout the subsurface volume of interest and must be done in a consistent and computationally efficient way, requiring the automated methodology taught by this invention. For example, FIG. 10 shows a single sample with its normal vector 90 indicated which becomes just a single point in the normal vector plot 99, which is itself just a 2-D slice of the 3-D volume of interest. Accurately and quickly generating a 3-D volume of normal vectors requires the robust automated method described in FIG. 1.

Figure 11A:
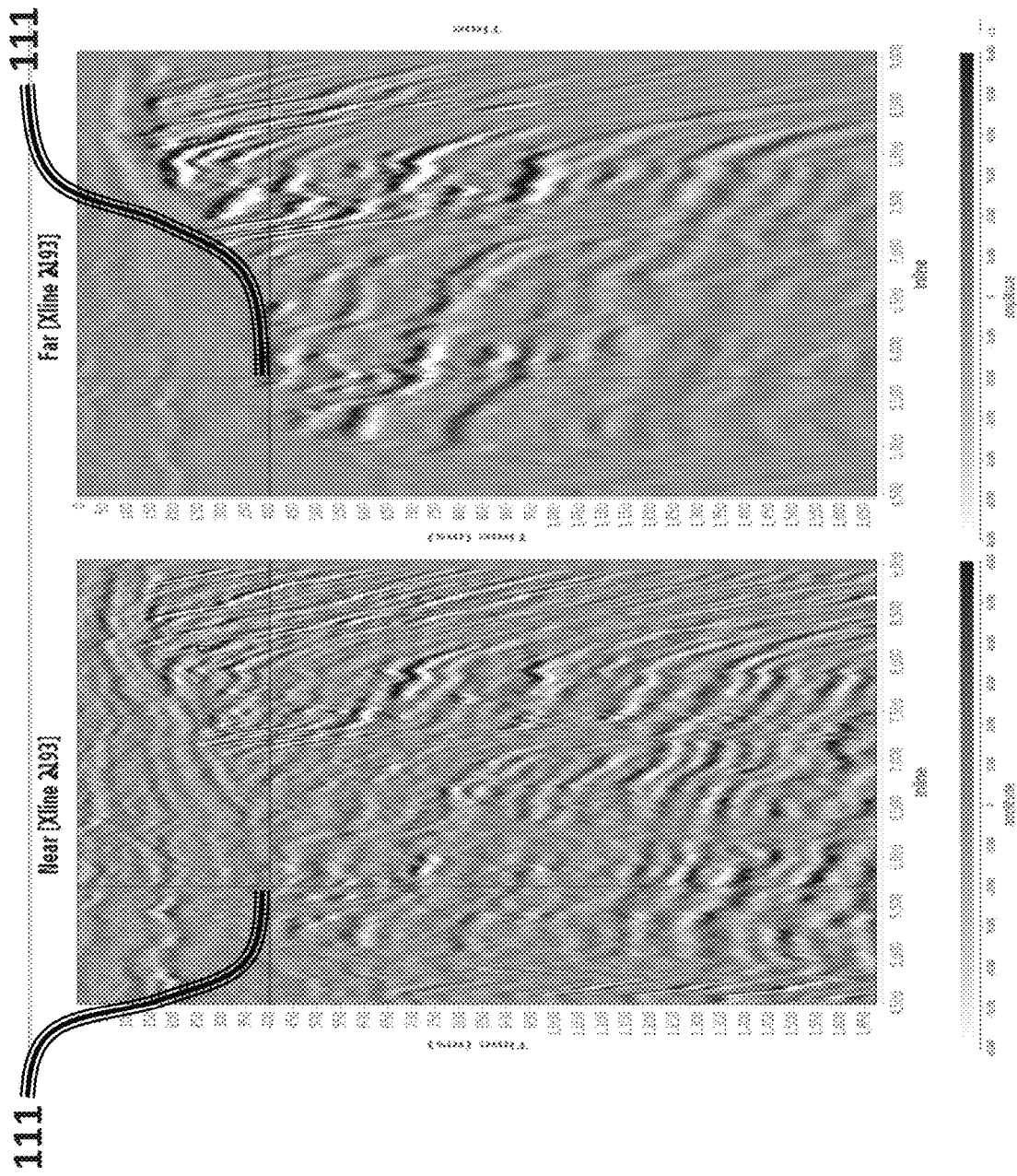
FIGS. 11A-11C illustrate steps and results of the method for seismic amplitude analysis, in accordance with some embodiments.
Figure 11B:
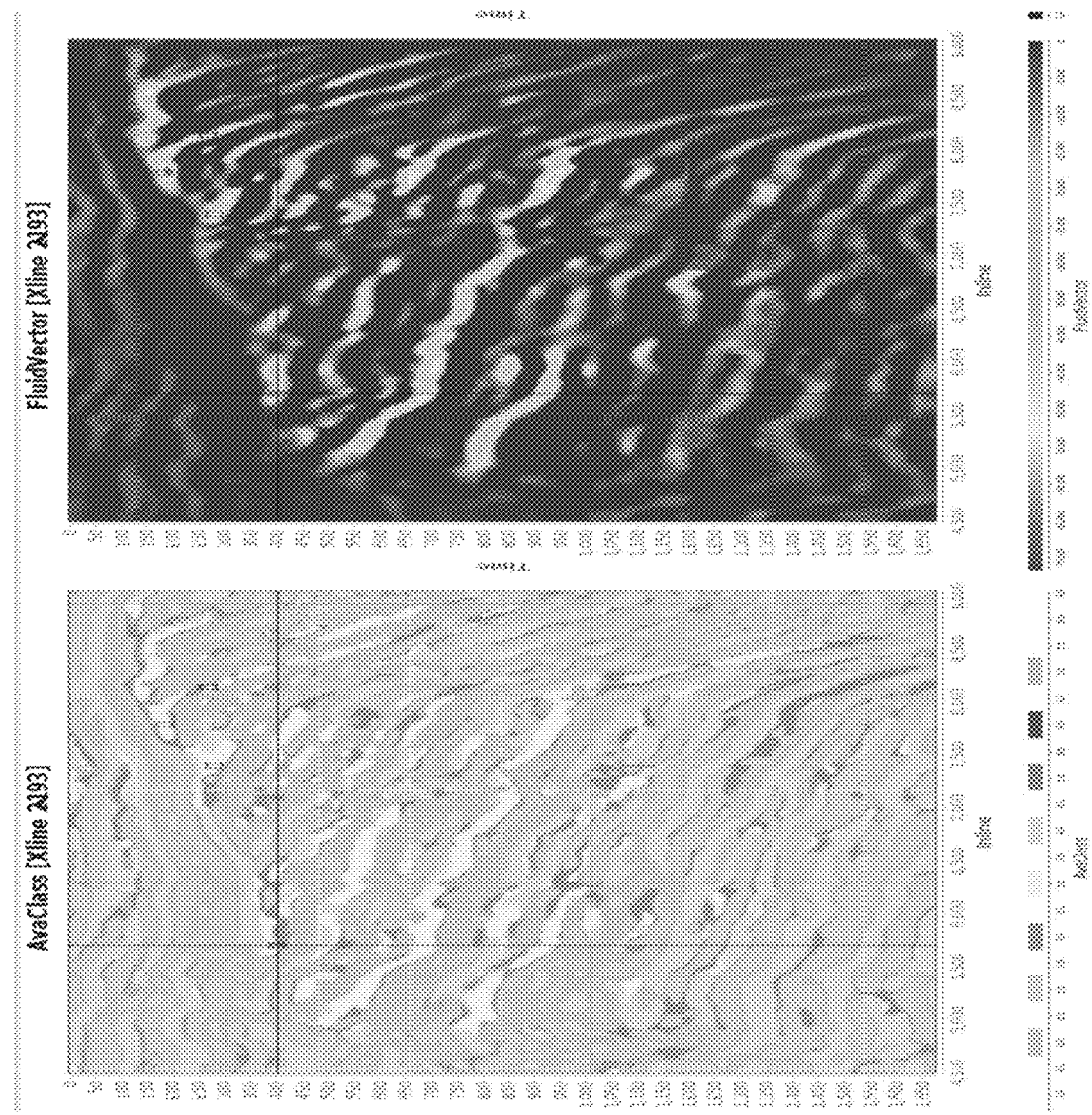
Figure 11C:
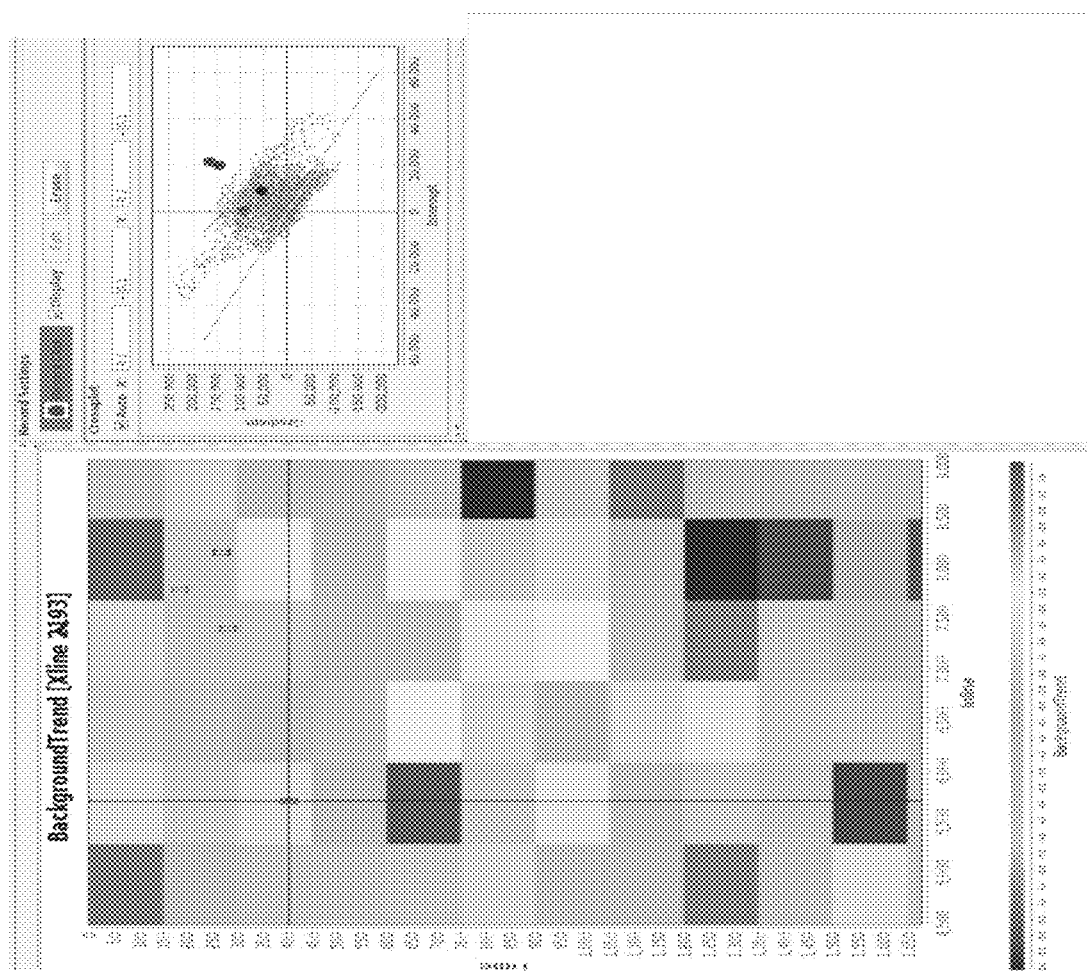

Examples of results of intermediate steps and results of method 100 are shown in FIGS. 11A-11C. In FIG. 11A, 2-D slice of the near angle stack (left) and the far angle stack (right) are shown. The position of a single sub-cube (111) is indicated by the crossed lines. In FIG. 11B, the AVA class that is the result of operation 14 is shown on the left and the fluid vector that is the result of operation 15 is shown on the right. FIG. 11C shows the temporally and spatially varying background trend computed by operation 14 on the left and on the right is an intercept-gradient plot with the background trend indicated.

The operation 15 of method 100 may additionally include seismic calibration. Seismic calibration is a way to prepare seismic data for quantitative analysis by calibration to reflectivity scale (i.e., calibrating to modeled seismic amplitudes), as is known to those of skill in the art.

The identified classes may be used for a variety of purposes to enable hydrocarbon identification and extraction, including but not limited to:
1. Automated detection of DHI and AVA anomalies by screening large volume of 3D seismic data for exploration or lease sales
2. Automated computation of spatially and temporally varying Background Trends (Shale/Shale or Shale/wet sands) in the intercept-gradient coordinates that represent changes in Pwave Vs. Swave velocity ratios across the basin. Compute spatially and temporally varying Background trends in the intercept and gradient space for estimating changes in background Vp/Vs ratio which can be an indicator of type of hydrocarbon in a basin.
3. Automated computation of Normal Vector or Fluid Vector to access the strength of seismic amplitude anomaly over pre-computed background trend from seismic data
4. Automated computation of Parallel Vector or porosity Vector to access changes in porosity based on pre-computed background trend from seismic data
5. Detection of 4D AVA anomalies
6. Geo-body extraction of AVA class attributes for application in static reservoir modeling
7. Compare AVA character of multiple prospects in seismic volume
8. Inversion of fluid type and rock properties by integrating well based AVA models
9. Compute de-noised angle stacks from pre-computed statistical intercept and gradient values
10. Automated estimation of calibration scalars to calibrate different angle stacks and scale to modeled shale amplitudes based on available well database
11. Compute elastic impedance (EEI) attributes based on intercept and gradient volumes at optimum "chi" angle to highlight property of interest The method described herein has many advantages over conventional methods. The key advantage of this method is the robust detection of background utilizing z-score statistics and not computing and gradient and intercept for those samples that contribute to noise in the gradient volume. Let's address the issues we pointed in the introduction:
1. Gather flatness: Instead of using single sample that require perfect flatness, the method disclosed herein relies on analyzing a distribution of amplitudes from small sub-cube. An optimum selection of time window should minimize the effect of un-flat gathers.
2. Frequency: Different frequency content for angle stacks would result in different variance of amplitude distributions. The standardized score (z-score) is normalized by standard error in the distribution and thus will have minimal influence in statistical inference.
3. Calibration: The present method does not require amplitudes to be calibrated across the time interval of interest as each sub cube over small time windows are analyzed for estimating AVA attributes. Unlike traditional methods, amplitude values do not require to be consistent across time. This method does require amplitude over small sub-cubes are consistent and calibrated for all angle ranges.
4. Side lobes: The present method relies on distribution of amplitudes and mean values for statistical inference and thus limit impact of side lobes.
5. The present method has no requirement of interpreted seismic horizons prior to analysis which removes the danger of ambiguous picking that often misses polarity changes.

Figure 12:
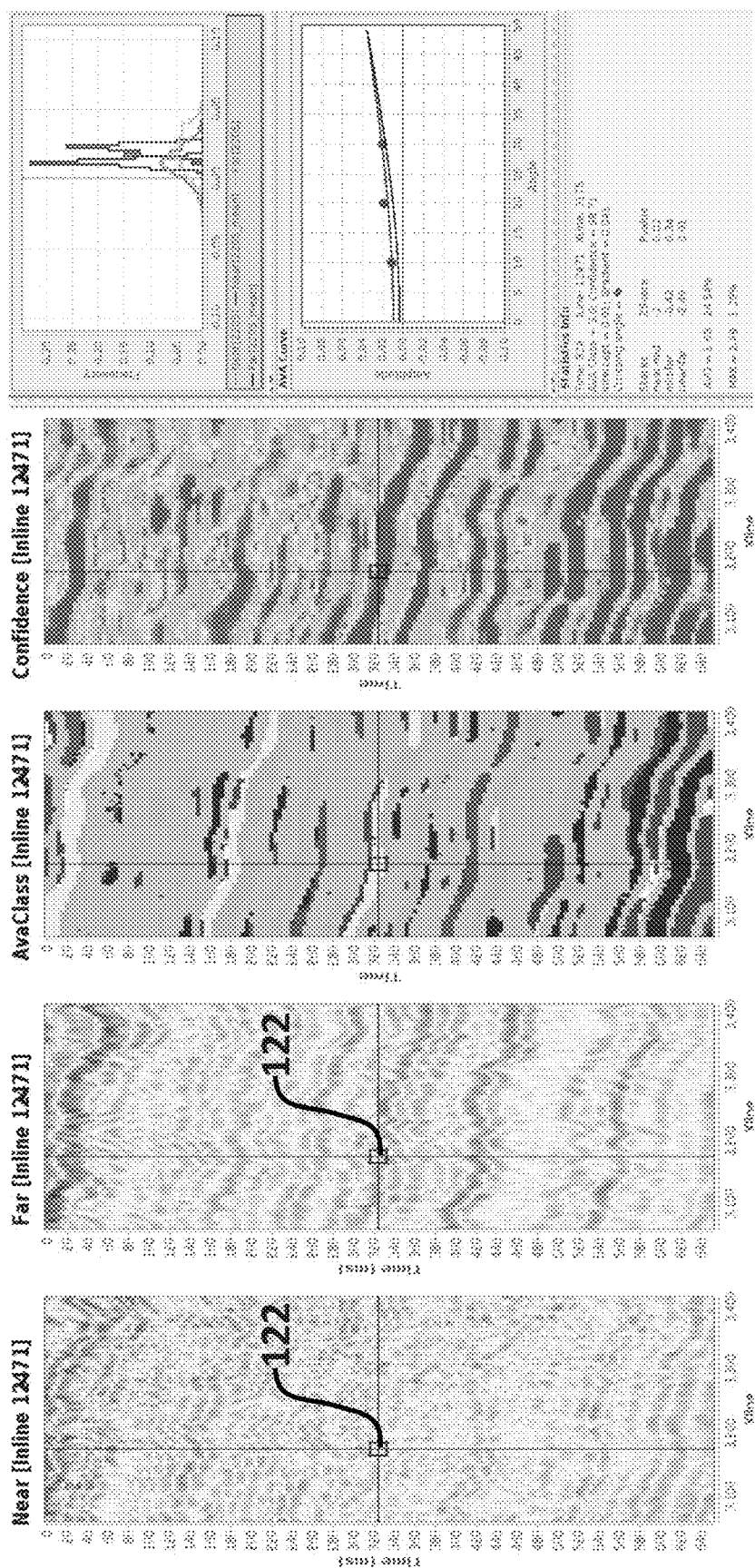
FIGS. 12 and 13 illustrate results of the method for seismic amplitude analysis, in accordance with some embodiments.
Figure 13:
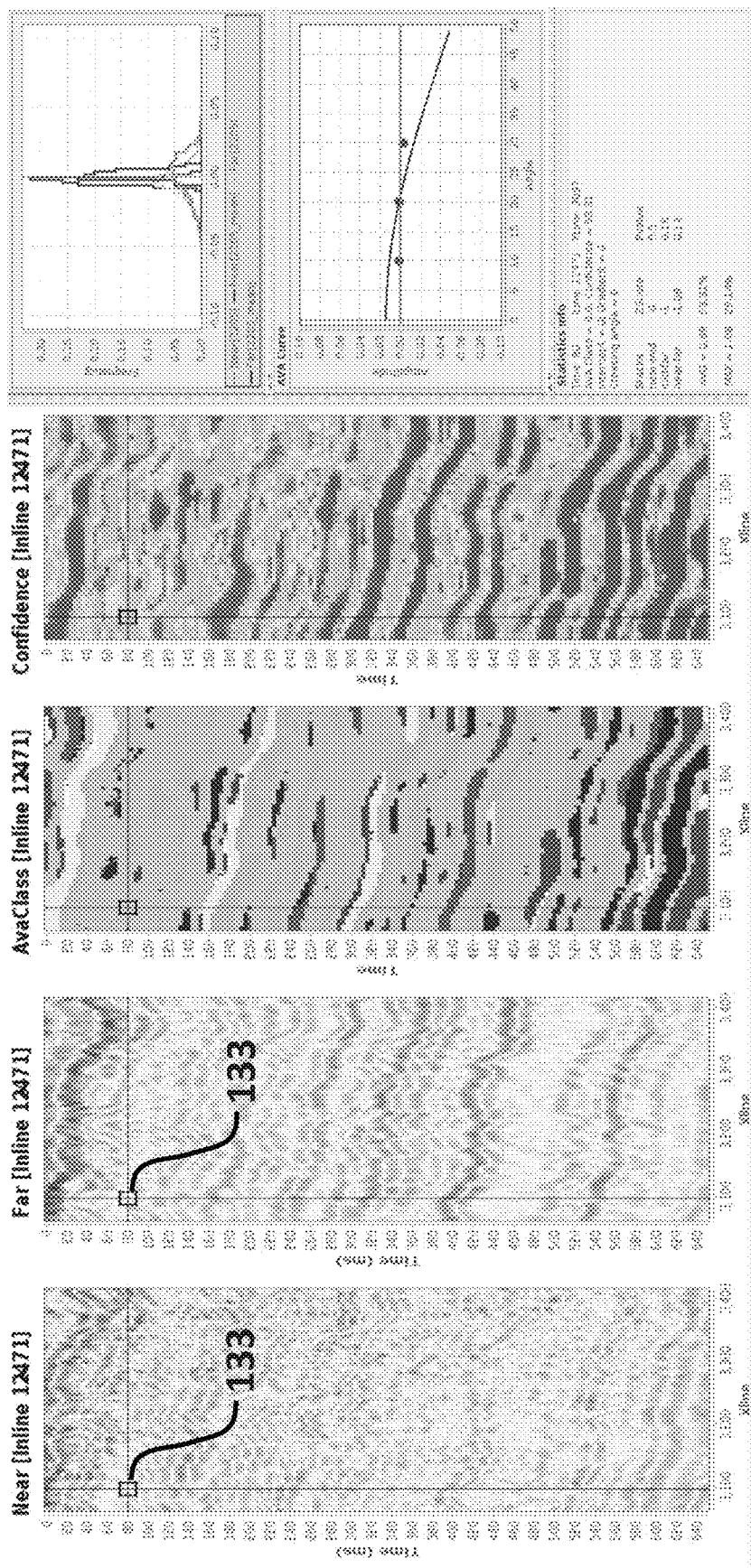

The identified AVA classes may be displayed by themselves and/or overlain on a seismic data volume. The display may be used for any of the applications described above to enable hydrocarbon identification and extraction. Examples of the graphical displays are shown in FIGS. 12 and 13. The near angle stack and far angle stack are shown with a single sub-cube indicated. In FIG. 12, this sub-cube 122 is centered on a sample that does correspond to a seismic event with an AVA anomaly while on FIG. 13, this sub-cube 133 is centered on a sample that corresponds to background. FIGS. 12 and 13 also include a Confidence panel which is generated from the standard score statistics. Higher confidence corresponds to bigger z-scores or better separation between the sample means.

Figure 14:
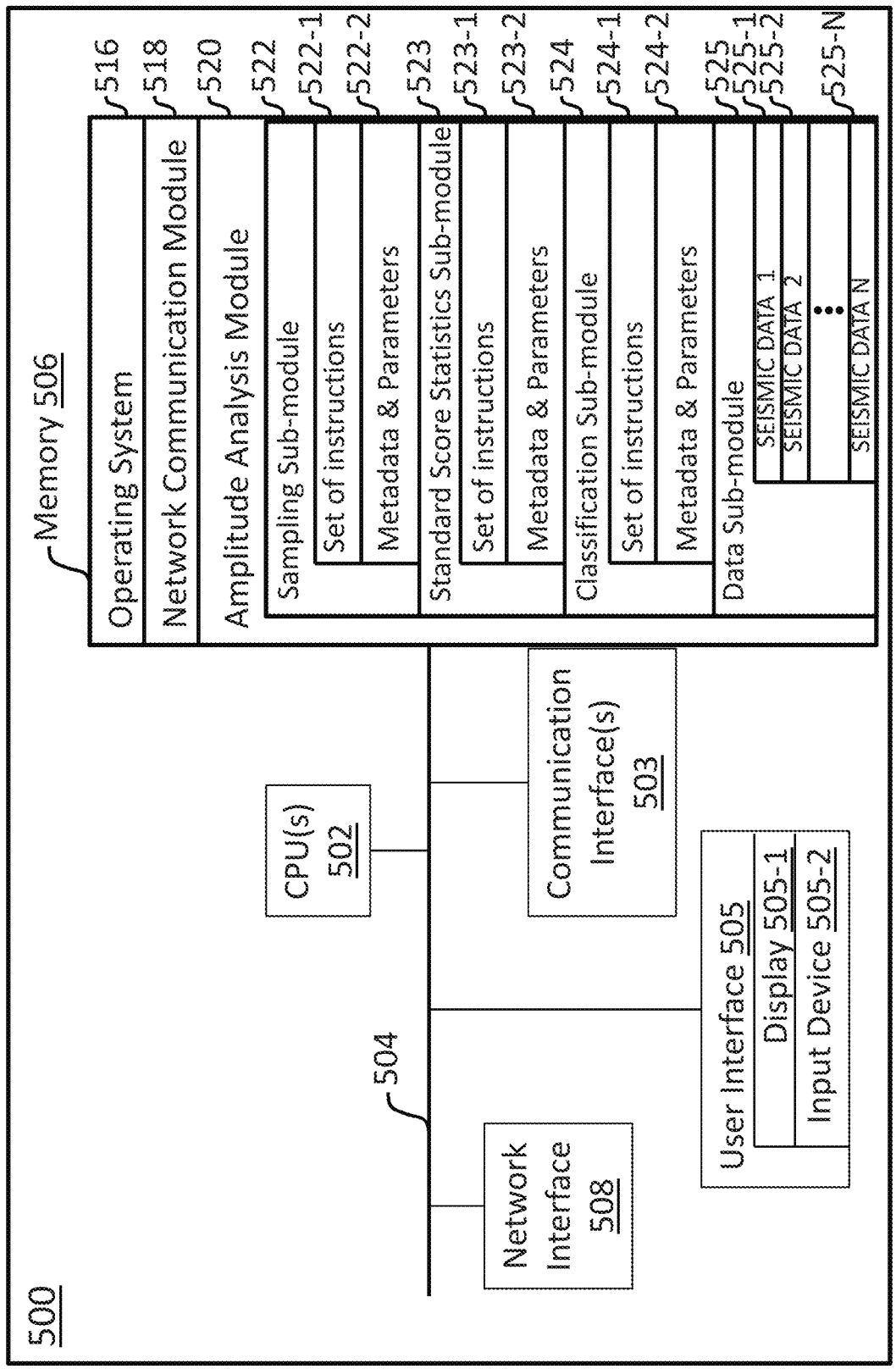
FIG. 14 is a block diagram illustrating a seismic amplitude analysis system, in accordance with some embodiments.

FIG. 14 is a block diagram illustrating a seismic amplitude analysis system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic amplitude analysis system 500 includes one or more processing units (CPUs) 502, one or more network interfaces 508 and/or other communications interfaces 503, memory 506, and one or more communication buses 504 for interconnecting these and various other components. The seismic amplitude analysis system 500 also includes a user interface 505 (e.g., a display 505-1 and an input device 505-2). The communication buses 504 may include circuitry (sometimes called a chipset) that interconnects and controls communications between system components. Memory 506 includes high-speed random-access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the amplitude analysis module 520 executes the operations of the method. Amplitude analysis module 520 may include data sub-module 525, which handles the seismic dataset including seismic data 525-1 through 525-N. This seismic data is supplied by data sub-module 525 to other sub-modules.

Sampling sub-module 522 contains a set of instructions 522-1 and accepts metadata and parameters 522-2 that will enable it to execute operation 10 of method 100 and generate the sets of sub-cubes. The standard score statistics sub-module 523 contains a set of instructions 523-1 and accepts metadata and parameters 523-2 that will enable it to execute operation 11 of method 100. The classification sub-module 524 contains a set of instructions 524-1 and accepts metadata and parameters 524-2 that will enable it to execute operations 12 through 15 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

The method is, optionally, governed by instructions that are stored in computer memory or a non-transitory computer readable storage medium (e.g., memory 506 in FIG. 14) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, the method is described as being performed by a computer system, although in some embodiments, various operations of the method are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of automated seismic amplitude analysis, comprising:
   a. receiving, at a computer processor, a seismic dataset representative of a subsurface volume of interest wherein the seismic dataset includes an angle or angle stack dimension;
   b. selecting, via the computer processor, a plurality of sets of sub-cubes in the seismic dataset wherein each set of sub-cubes includes a plurality of the angles or the angle stacks;
   c. computing, via the computer processor, standard score statistics for each of the plurality of sub-cubes;
   d. identifying, via the computer processor, amplitude variation with angle (AVA) anomalies based on the standard score statistics for each of the set of sub-cubes wherein the identifying classifies background shale AVA in sub-cubes that contain statistically similar distribution of amplitudes for all of the angles or angle stacks and a mean amplitude substantially equal to zero for all of the angles or angle stacks and classifies all other sub-cubes as AVA anomalies;
   e. for the sub-cubes classified as background shale AVA, identifying a background trend line in intercept-gradient space from shale and wet sands top and base interfaces;
   f. storing the background trend line to generate a spatially and temporally varying background trend for the subsurface volume of interest;
   g. computing an intercept and gradient for each sample in each of the sub-cubes classified as AVA anomalies to a reflectivity equation using a least-squared regression;
   h. classifying, via the computer processor, the AVA anomalies to generate classified AVA anomalies based on the intercepts and gradients; and
   i. displaying, on a user interface, the classified AVA anomalies as a graphical display.

2. The method of claim 1 further comprising:
calculating a perpendicular distance of intercept and gradient for each of the set of sub-cubes from the background trend line to generate an anomaly strength.

3. The method of claim 1 further comprising:
calculating a distance of intercept and gradient computed for each of the set of sub-cubes from the normal to the background trend line passing through the origin to generate a mean porosity trend.

4. The method of claim 1 further comprising identifying direct hydrocarbon indicators (DHIs) based on the classified AVA anomalies.

5. The method of claim 1 wherein the standard score statistics may be z-score statistics, t-test statistics, or any other statistics that compare distributions of two populations.

6. A computer system, comprising:
one or more processors;
memory; and
one or more programs, wherein the one or more programs are stored in the memory and configured to be executed by the one or more processors, the one or more programs including instructions that when executed by the one or more processors cause the system to:
   a. receive, at the one or more processors, a seismic dataset representative of a subsurface volume of interest wherein the seismic dataset includes an angle or angle stack dimension;
   b. select, via the one or more processors, a plurality of sets of sub-cubes in the seismic dataset wherein each set of sub-cubes includes a plurality of the angles or the angle stacks;
   c. compute, via the one or more processors, standard score statistics for each of the plurality of sub-cubes;
   d. identify, via the one or more processors, amplitude variation with angle (AVA) anomalies based on the standard score statistics for each of the set of sub-cubes wherein the identifying classifies background shale AVA in sub-cubes that contain statistically similar distribution of amplitudes for all of the angles or angle stacks and a mean amplitude substantially equal to zero for all of the angles or angle stacks and classifies all other sub-cubes as AVA anomalies;
   e. for the sub-cubes classified as background shale AVA, identify a background trend line in intercept-gradient space from shale and wet sands top and base interfaces;
   f. storing the background trend line to generate a spatially and temporally varying background trend for the subsurface volume of interest
   g. compute an intercept and gradient for each sample in each of the sub-cubes classified as AVA anomalies to a reflectivity equation using a least-squared regression;
   h. classify, via the one or more processors, the AVA anomalies to generate classified AVA anomalies based on the intercepts and gradients; and
   i. display, on a user interface, the classified AVA anomalies as a graphical display.

* * * * *